United States Patent [19]

Chang

[11] Patent Number: 5,436,720
[45] Date of Patent: Jul. 25, 1995

[54] ACOUSTO-OPTICAL LASER DISCRIMINATOR

[75] Inventor: I-Cheng Chang, Sunnyvale, Calif.

[73] Assignee: Litton Systems, Inc., San Jose, Calif.

[21] Appl. No.: 584,678

[22] Filed: Feb. 29, 1984

[51] Int. Cl.$^6$ .......................... G01B 11/26; G01B 9/02
[52] U.S. Cl. .................. 356/141.2; 356/346; 356/363; 356/323; 356/325; 356/328
[58] Field of Search ............... 356/346, 363, 323, 325, 356/328, 141, 152, 141.2

[56] References Cited

U.S. PATENT DOCUMENTS

| | | | |
|---|---|---|---|
| 3,934,153 | 1/1976 | Lindley et al. | 250/578 |
| 3,942,109 | 3/1976 | Crumly et al. | 324/77 |
| 3,962,577 | 6/1976 | Lindley et al. | 250/226 |
| 4,052,121 | 10/1977 | Chang . | |
| 4,217,036 | 8/1980 | Chang | 350/358 |
| 4,342,502 | 8/1982 | Chang | 350/358 |

OTHER PUBLICATIONS

"Optical Heterodyne Detection Using a Collinear Acoustooptic Interaction in a Trigonal Crystal" by A. A., Lipovskil and A. S. Shcherbakov,—Soviet Phys. Tech. Phys. 22(9), Sep. 1977, translated and published 1978 by the American Institute of Physics.

"Acousto-Optic Tunable Filters" by I. C. Chang, vol. 20, No. 6, Nov./Dec. 1981 of Optical Engineering.

Book: "Acousto-Optic Signal Processing Theory and Implementation" Edited by Norman J. Berg and John N. Lee, Published by Marcel Dekker, Inc. 270 Madison Ave., New York, N.Y., 1983.

Primary Examiner—Stephen C. Buczinski
Attorney, Agent, or Firm—Robert F. Rotella; Harold E. Gillmann

[57] ABSTRACT

An apparatus, using two acousto-optical tuned filters for determining the wavelength and angle of approach of a light wave.

6 Claims, 4 Drawing Sheets ance action, for example, of an incoming missile having a laser controlled guidance system.

ACOUSTO-OPTICAL LASER DISCRIMINATOR

BACKGROUND OF THE INVENTION

It is desirable to be able to obtain the wavelength and direction of arrival of an incoming laser signal. Such signals, for example, could be laser radar signals. Detection of the wavelength and direction of arrival could allow the vehicle supporting the detector to take avoidance action, for example, of an incoming missile having a laser controlled guidance system.

BRIEF DESCRIPTION OF THE INVENTION

Acousto-optical filters are summarized in an article entitled "Acousto-Optic Tunable Filters" appearing pages 824–829 in the November/December 1981 issue of The Journal of Optical Engineering (Vol. 20, No. 6).

In an acousto-optic tuned filter the relation between the optical wavelength, $\lambda_o$, within the acousto-optical tuned filter passband, the acoustical frequency, $f_a$, and the light incidence angle, $\theta_i$, relative to the optical axis of the crystal is $$\lambda_o f_a = P(\theta_i).$$

Observation of a typical plot of $\lambda_o f_a$ against $\theta_i$, mechanizing the equation $\lambda_o f_a = P_1(\theta_i)$ produces a monotonically increasing function within a typical range of 20 to 80 degrees of $\theta_i$.

It is contemplated by this invention to use a second acousto-optical tuned filter which is in some respect different from the first acousto-optical tuned filter to produce a second functional relation, $\lambda_o f_a' = P'(\theta_i)$. This may conveniently be accomplished by using a second acousto-optical tuned filter identical to the acousto-optical tuned filter which produced the function $P_1(\theta_i)$ but rotated 180 degrees about an axis to produce a second functional relation $$\lambda_o f_a' = p'(\theta_i)$$

which has a sufficiently broad usable range of $\theta_i$.

Consider the two functions, $P_1$ and $P'$ wherein each acousto-optical tuned filter receives the same light having a wavelength $\lambda_o$ with the same angle of approach, $\theta_i$. In each instance, the acoustical frequency $f_a$ may be supplied, for example, by a frequency modulated acoustical signal, or a by a plurality of simultaneous frequencies of acoustical signal, one of which is identified as $f_a$, and one of which is identified as $f_a'$. $f_a$ or $f_a'$ is identified when a corresponding signal $P_1$ or $P'$ is detected. From the curves of $P_1$ and $P'$, one can determine the corresponding ratio of $P_1/P'$ functions. One can plot the ratio of $f_a/f_a'$ against $\theta_i$. When $f_a$ and $f_a'$ are determined, one can then look to the curve of $f_a/f_a'$ against $\theta_i$ to obtain $\theta_i$.

Once $\theta_i$ is determined, and it is substituted into either equation with its corresponding frequency, then $$P_1(\theta_i)/f_a = P'(\theta_i)/f_a' = \lambda_o.$$

With identical acousto-optical tuned filters, but with the acousto-optical tuned filters differently oriented, the total field of view, or usable internal angle range is typically on the order of sixty (80–20) degrees.

It is therefore, for light of given wavelength and angle of arrival, an object of this invention to determine that wavelength and/or angle of arrival.

Other objects will become apparent from the following description taken together with the accompanying drawings.

DETAILED DESCRIPTION OF THE INVENTION

It is desirable to be able to obtain the wavelength and direction of arrival of an incoming laser signal. Such signals, for example, could be a laser radar signal. Detection of the wavelength and direction of arrival could allow the vehicle supporting the detector to take avoidance action, for example, of an incoming missile having a laser controlled guidance system.

Figure 1:
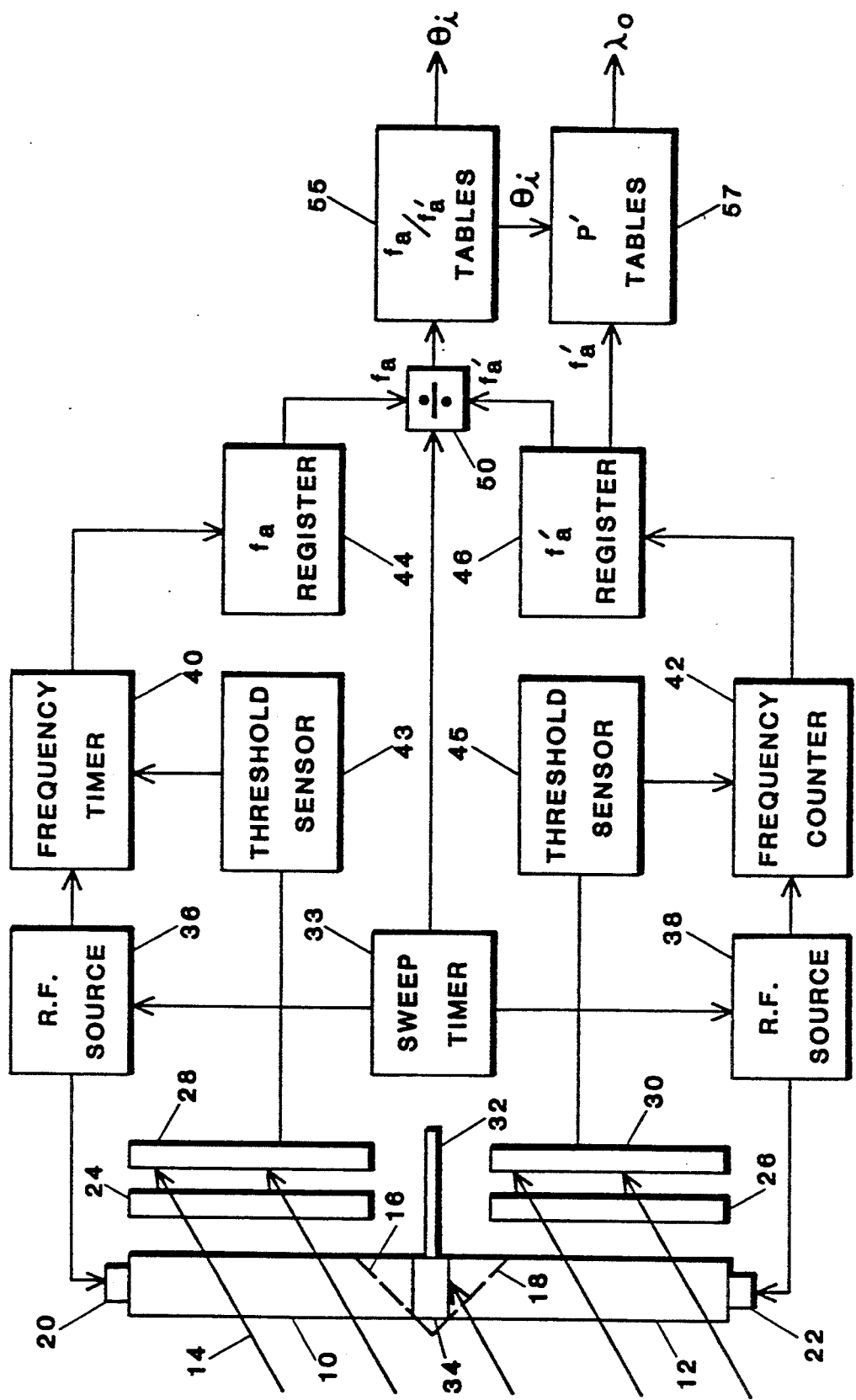
FIG. 1 is a block diagram of part of the apparatus of this invention, together with a computer block diagram for computing $\theta_i$ and $\lambda_o$.

A typical embodiment of the invention is shown in FIG. 1. Two substantially identical acousto-optical tuned filters 10 and 12 are positioned adjacent each other to receive light 14 of the same wavelength arrival $\lambda_o$ and from the same angle of arrival $\theta_i$. Note, however, that the optical axes 16 and 18 are oriented in different directions relative to the incoming Light 14. This is achieved with substantially identical acousto-optical tuned filters 10 and 12 which are turned relative to each other. The invention is riot limited to the use of identical acousto-optical tuned filters, but the use of such acousto-optical tuned filters has been found to create a larger useful range of the angle of approach of the light. Note that the angle of approach is not specified relative to a particular axis. The reference axis is not important as long as the direction of the reference axes on the two acousto-optical tuned filters is in the same direction.

The acousto-optical tuned filters 10 and 12 are driven by two piezoelectric transducers 20 and 22 which convert electrical signals into acoustical signals to deliver acoustical waves to the acousto-optical tuned filters 10 and 12.

Behind the acousto-optical tuned filters 10 and 12 are polarizers 24 and 26 which polarize the light from the acousto-optical tuned filters 10 and 12 before the light strikes the light sensors 28 and 30. A light barrier 32 prevents the light from acousto-optical tuned filter 10 striking sensor 30 and the light from acousto-optical tuned filter 12 striking sensor 28. The acoustical path is terminated in an acoustical termination such as indium, magnesium or copper of the proper sound impedance to prevent reflections.

The acoustical transducer crystals 20 and 22 are driven from radio frequency sources 36 and 38. In the shown FIG. 1, the radio frequency sources are adapted to sweep over a range of signals. The frequency counters 40, 42 monitor the frequencies of sources 36 and 38. That is, the counters 40 and 42 continually produce a signal that is a measure of the frequency sources 36 and 38, respectively. Each frequency sweep is initiated by a sweep timer 33 As the frequencies of sources 36 and 38 are swept over their working range, an output signal from sensors 28 or 30 having an amplitude that exceeds the present threshold of sensors 43 or 45 causes the counters 40 or 42 to dump the reading of its respective frequency into one or the other of the registers 44 or 46. At the end of the frequency sweep the sweep timer 33 causes the divider 50 to divide the output of register 44 by the output of register 46. The output of the divider 50 is delivered to a set of $f_a/f_a'$ tables 55 to produce the signal of the angle of approach $\theta_i$ in the manner described below.

The output signal $\theta_i$, together with the signal $f_a$, are also delivered to a set of P' tables to produce a signal that is a measure of $\lambda_o$ according to the equations following herein.

In an acousto-optical tuned filter, the relation between the optical wavelength, $\lambda_o$ within the acousto-optical tuned filter passband, the applied acoustical frequency, $f_a$, and the angle of approach, $\theta_i$ is $$\lambda_o f_a = P(\theta_i).$$

Figure 2:
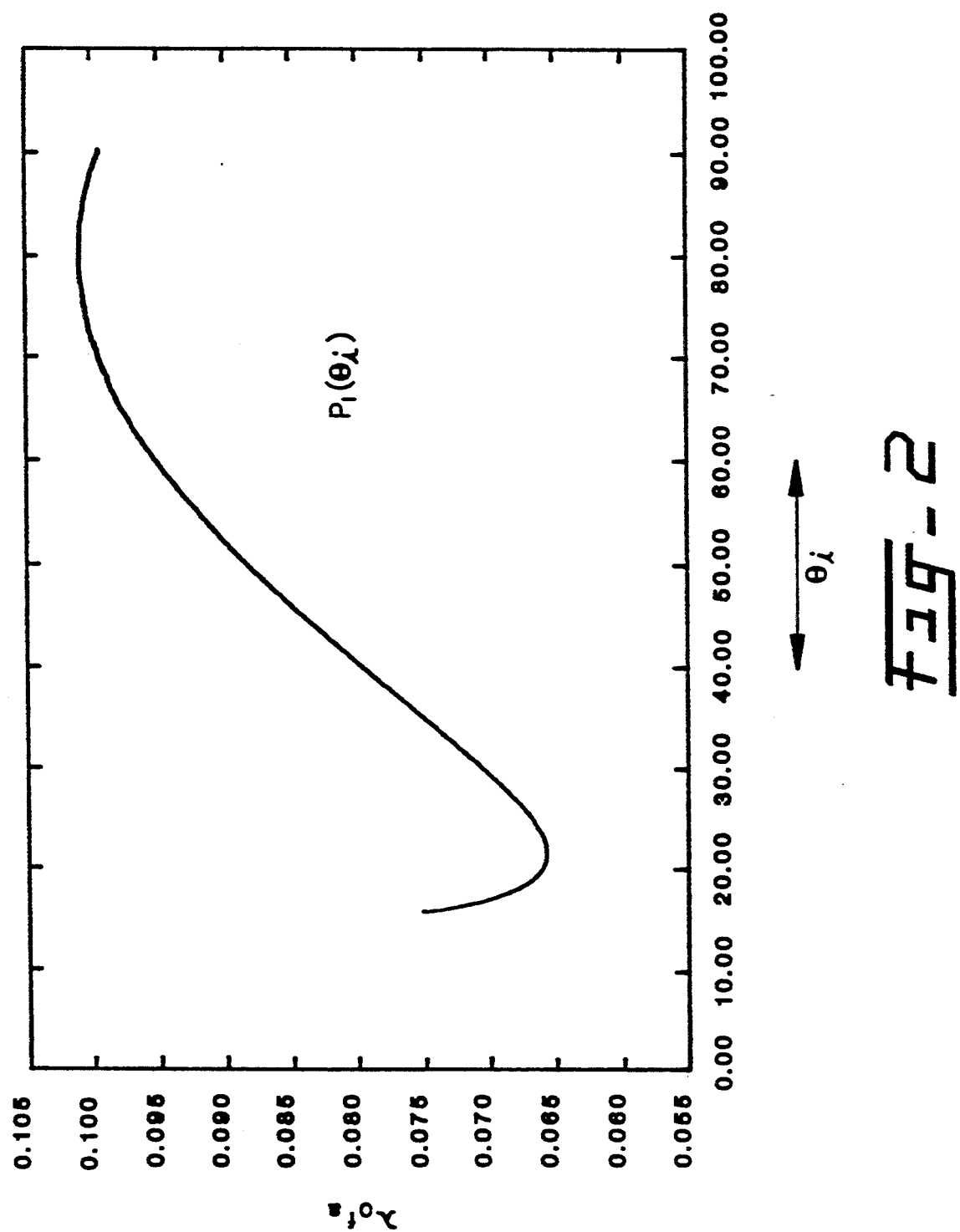
FIG. 2 is a plot of $P_1(\theta_i)$ against $\theta_i$.

Observation of a typical plot of $\lambda_o f_a$ against $\theta_i$, in acousto-optical tuned filter 10 mechanizes the equation $\lambda_o f_a = P_1(\theta_i)$ to produce a monotonically increasing function, as shown in FIG. 2, within a typical range of 20 to 80 degrees of $\theta_i$.

Figure 3:
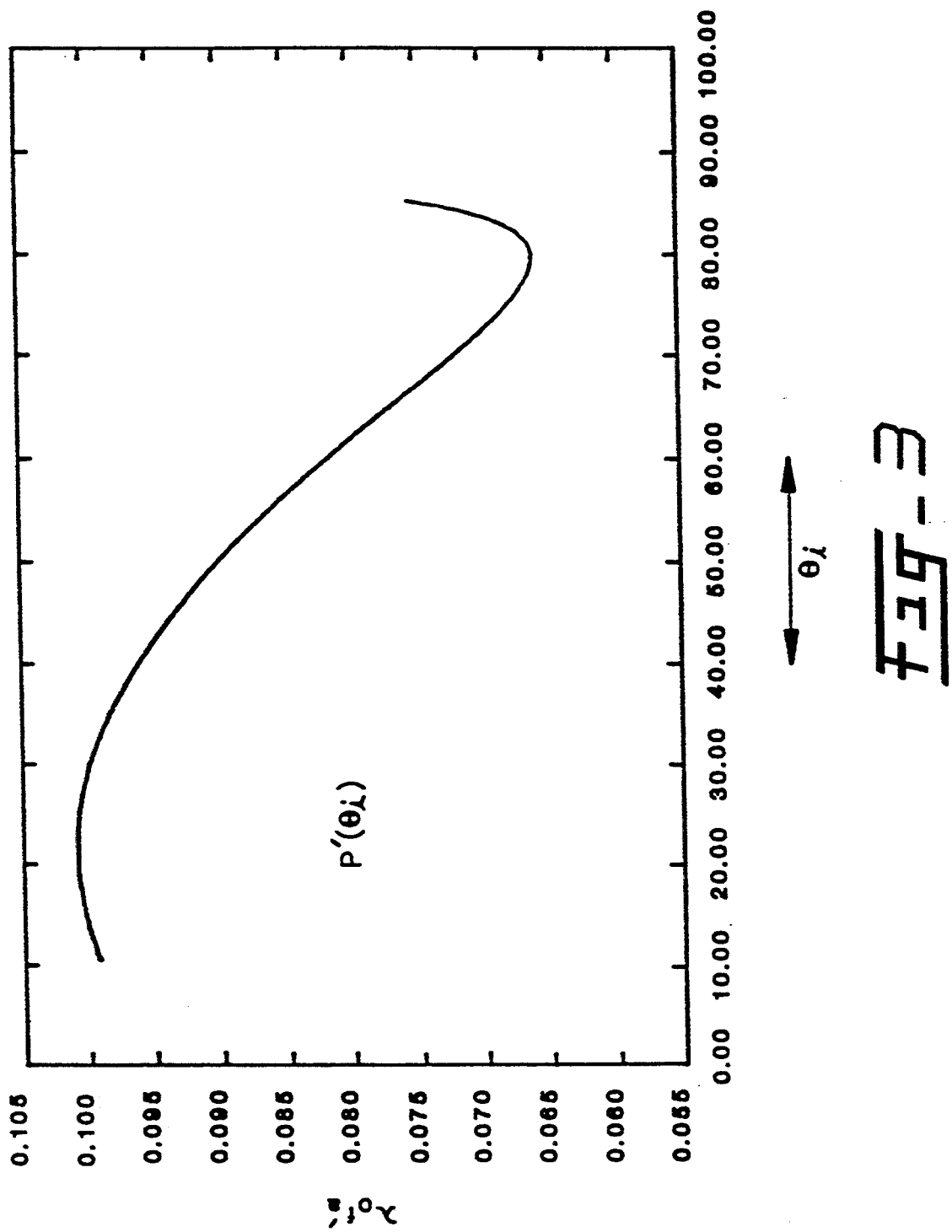
FIG. 3 is a plot of a typical $P'(\theta_i)$.

It is contemplated by this invention to use a second acousto-optical tuned filter which is in some respect different than the first acousto-optical tuned filter 10 to produce a second functional relation, $\lambda_o f_a' = P'(\theta_i)$. This may conveniently be accomplished by using a second acousto-optical tuned filter 112 identical to the acousto-optical tuned filter 10 which produced the function $P_1(\theta_i)$ but rotated 180 degrees about an axis to produce the second function $$\lambda_o f_a' = P'(\theta_i)$$

shown in FIG. 3.

Figure 4:
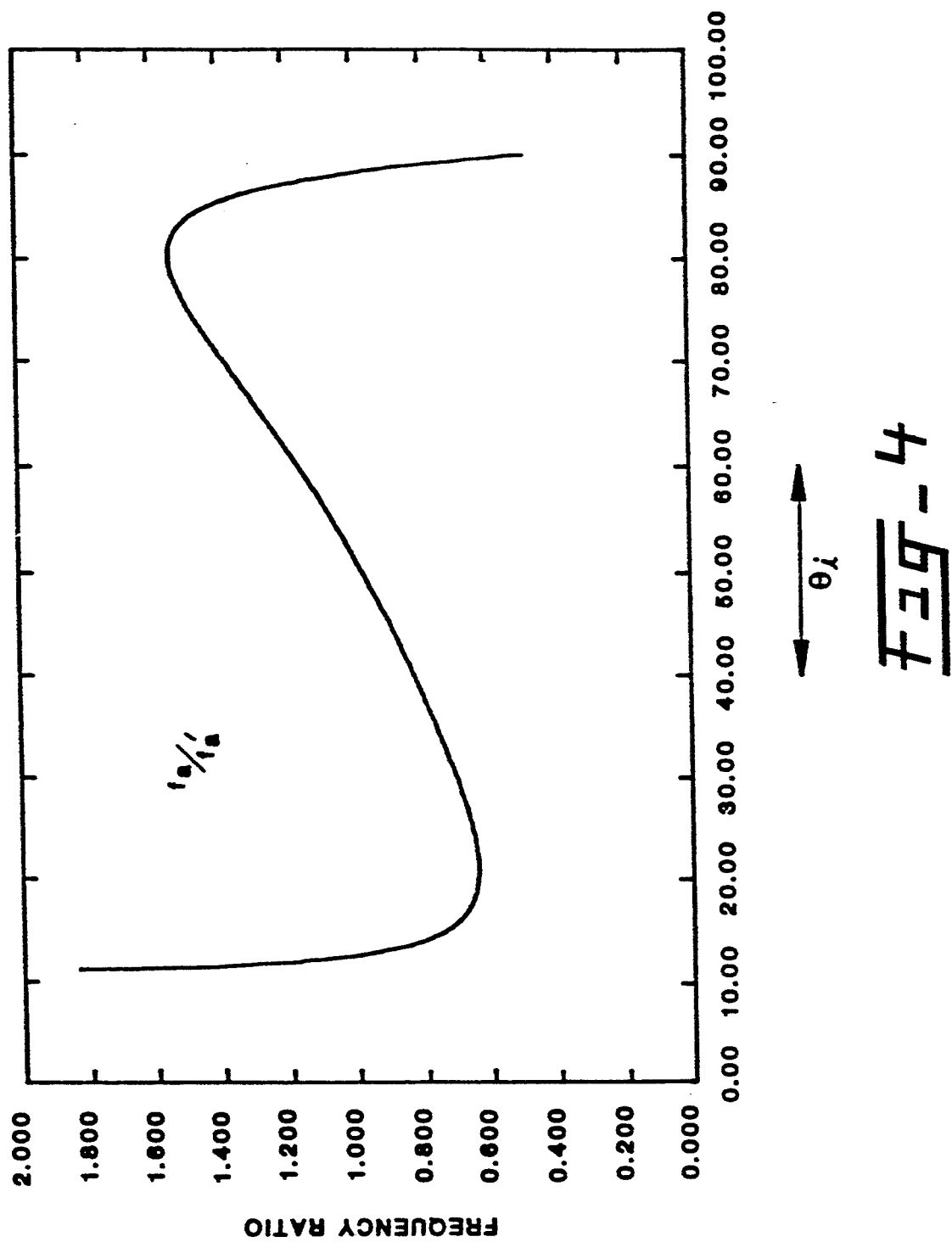
FIG. 4 is a plot of $f_a/f_a'$ against $\theta_i$.

Consider the two functions, $P_1$ and P' wherein each acousto-optical tuned filters 10 and 12 has the same light having a wavelength $\lambda_o$ and the same angle of approach, $\theta_i$. In each instance, the frequency $f_a$ may be supplied, for example, by a frequency modulated acoustical signal, or a plurality of simultaneous frequencies of acoustical signal may be supplied, one of which is identified as $f_a$ and one of which is identified as $f_a'$. $f_a$ or $f_a'$ is identified when a corresponding signal $P_1$ or P' is detected. From the curves of $P_1$ and P', one can determine the corresponding ratio of $P_1/P'$ which is the same ratio as $f_a/f_a'$. $f_a/f_a'$ may be plotted against $\theta_i$ as shown in FIG. 4. When $f_a$ and $f_a'$ are determined, one can then look to the curve of $f_a/f_a'$ against $\theta_i$ to obtain $\theta_i$.

Once $\theta_i$ is determined, and it is substituted into either the equation $P_1$ or P', with its corresponding frequency, then $$P_1(\theta_i)/f_a = P'(\theta_i)/f_a' = \lambda_o.$$

With identical acousto-optical tuned filters 10 and 12, but with acousto-optical tuned filters 10 and 12 differently oriented relative to their optical axes, the total field of view, or usable angle of approach range typically is on the order of sixty (80–20) degrees.

In operation, the light whose wave length and angle of approach is to be measured is incident upon the two acousto-optical tuned filters 10 and 12. The filters 10 and 12 are acoustically driven by the piezoelectric crystals 20 and 22, respectively. The incoming light 14 travels through the filters 10 and 12, and the polarizers 24, 26 to be detected by the light sensors 28, 30, respectively. A sweep timer 33 starts the frequency sweep of the radio frequency sources 36, 38 which drive the crystals 20,22, respectively. The frequency counters 40,42 count the frequency of the sources 36, 38, respectively, and they deliver signals to the registers 44,46, respectively, when the threshold sensors 43, 45 sense that a signal above a predetermined amplitude has appeared at the sensors 28,30, respectively. The radio frequency sources 36,38 sweep over a predetermined band of radio frequencies. The sweep timer 33 then sends a signal to the divider 50 to sense the signals in the registers 44 and 46 and to divide the signal in register 44 by the signal in register 46. The quotient signal is then delivered to a lookup means 55 which contains a table of $f_a/f_a'$ as a function of $\theta_i$. It must be noted that the divider 50 could have divided $f_a'$ by $f_a$ and the lookup means 55 would then have a table of $f_a'/f_a$ as a function of $\theta_i$. $\theta_i$ is one of the variables to be determined. That value is delivered to the lookup means 57 along with the frequency value from the $f_a'$ register. The lookup means 57 finds the value of P' for the value of $\theta_i$, and P' is then divided by $f_a'$. Alternatively, lookup means 57 may contain the value of $P_1$ as a function of $\theta_i$ and $P_1$ is then divided by $f_a'$.

It is important for expanding the coverage of the claims to express the apparatus differently. It may be expressed in the following ways.

The apparatus of FIG. 1 determines the value of third and fourth variable signals, $\theta_i$ and $\lambda_o$ which are applied to the apparatus 10 and 12.

first and second apparatus 10 and 12 produce first and second different signals $P_1$ and P', respectively, in response to such third and fourth signals $\theta_i$ and $\lambda_o$, and to fifth and sixth variable signals, $f_a$ and $f_a'$;

The first and second variable signals have first and second independent functional relationships to the third variable signal $\theta_i$;

In particular, the first signal $P_1$ is equal to the product of the fourth variable signal $\lambda_o$ and the fifth variable signal $f_a$. Similarly, the second signal P' is equal to the product of the fourth variable signal $\lambda_o$ and the sixth variable signal $f_a'$. A dividing means 50 is connected to receive the first and second signals $P_1$ and P' and to divide such first signal $P_1$ by the second signal P' to create a seventh signal which is equal to the ratio $f_a/f_a'$ of the fifth and sixth signals, $f_a$ to $f_a'$. A table lookup means 55 creates a signal which is a measure of the value of the third signal $\theta_i$ from the seventh signal $f_a/f_a'$. Another lookup, means produces a signal which is a measure of the value of the fourth signal $\lambda_o$ from the first signal $P_1$, the value of the third signal $\theta_i$ and of the fifth signal $f_a$. Similarly, a lookup means 57 may be used to create a signal which is a measure of the value of the fourth signal $\lambda_o$ from the second signal P', the value of the third signal $\theta_i$ and the sixth signal $f_a'$.

Other embodiments may be described and claimed having scope between the general description of the paragraph above and the specific description of FIG. 1.

Although the invention has been described in detail above, it is not intended that the invention shall be limited by that description but only by the description taken together with the accompanying claims.

I claim:

1. Apparatus for determining the angle of approach $\theta_i$ of incoming light comprising:

first and second acousto-optical tuned filters positioned relative to each other to receive the same wavelength $\lambda_o$ of light arriving with the same approach angle $\theta_i$;

first and second means for delivering variable frequency acoustical waves at first and second frequencies $f_a$ and $f_a'$ to said acousto-optical tuned filters, respectively;

first and second optical sensing means, respectively, including polarizing means, for receiving light from said acousto-optical tuned filters, respectively, and for producing signals that are independent functions $P_1$ and $P'$ of said approach angle $\theta_i$, such functions being equal to $f_a\lambda_o$ and $f_a'\lambda_o$, respectively;

means for dividing said $P_1$ signal by said $P'$ signal to produce a signal that is a measure of $f_a/f_a'$; and first lookup means containing a predetermined table of the relation between $f_a/f_a'$ and $\theta$, receiving said $f_a/f_a'$ signal to produce a signal that is a measure of the approach angle $\theta_i$.

2. Apparatus as recited in claim 1 and further including apparatus for determining the wavelength $\lambda_o$, comprising:

second lookup means containing a predetermined table of the relation between $P_1$, $f_a$ and $\theta_i$, receiving said approach angle signal $\theta_i$ and said frequency $f_a$ to produce a signal that is a measure of the wavelength $\lambda_o$.

3. Apparatus as recited in claim 1 and further including apparatus for determining the wavelength $\lambda_o$, comprising:

second lookup means containing a predetermined table of the relation between $P'$, $f_a'$ and $\theta_i$ receiving said approach angle signal and said frequency $f_a'$ to produce a signal that is a measure of the wavelength $\lambda_o$.

4. Apparatus as recited in claim 1 in which said means for delivering variably frequency acoustical signals comprises chirp generators for covering a predetermined range of frequencies.

5. Apparatus as recited in claim 1 in which said means for delivering variable frequency acoustical signals comprises means for concurrently delivering an entire spectrum of acoustical signals.

6. Apparatus as recited in claim 5 in which said means for concurrently delivering an entire spectrum of acoustical signals comprises comb generators.

* * * * *